Figure 1:
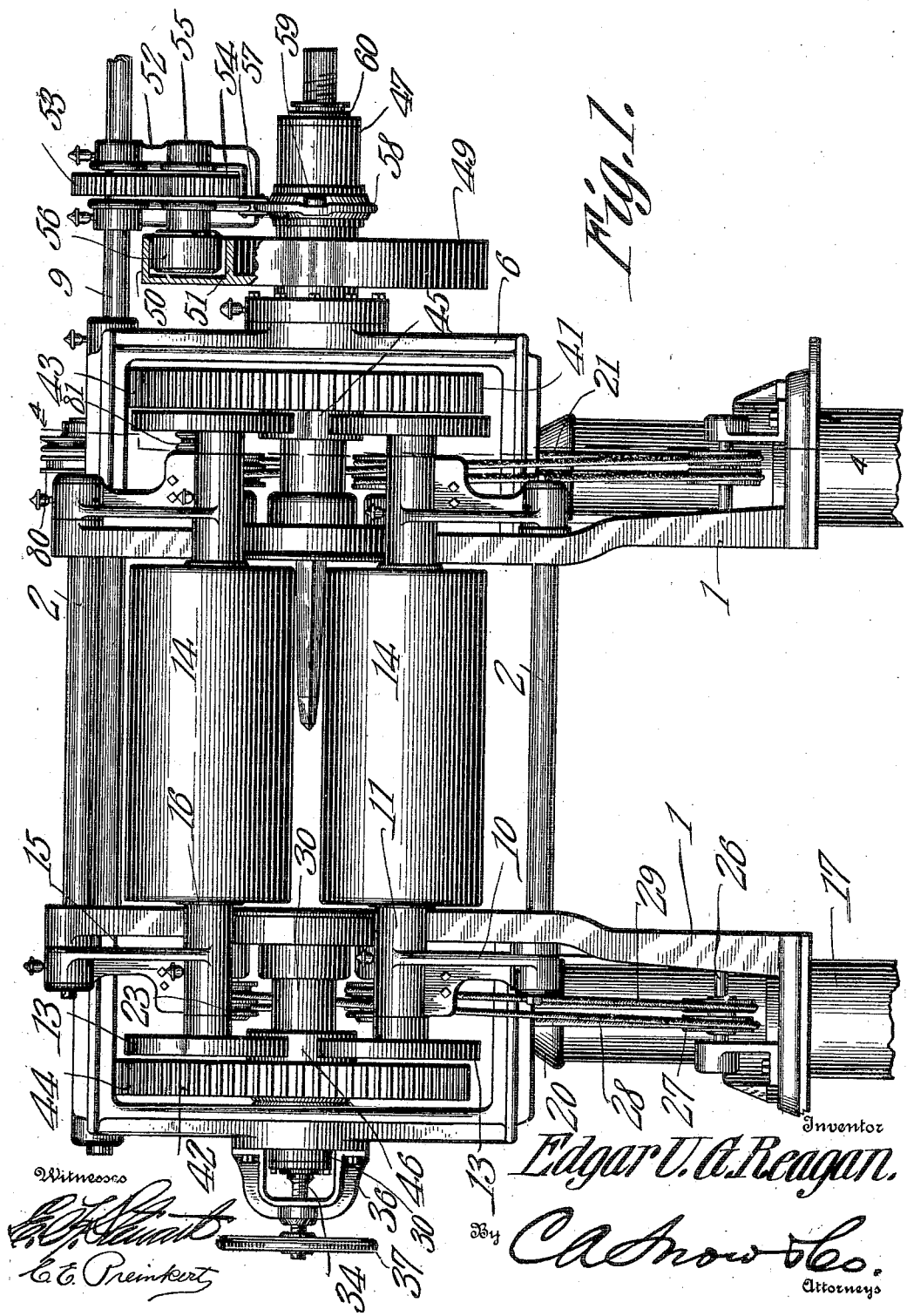

E. U. G. REAGAN.
ROLLER PRESS.
APPLICATION FILED OCT. 9, 1909.

983,086.

Patented Jan. 31, 1911.
9 SHEETS—SHEET 1.

Witnesses

Inventor
Edgar U. G. Reagan.
By C. A. Snow & Co.
Attorneys

E. U. G. REAGAN.
ROLLER PRESS.
APPLICATION FILED OCT. 9, 1909.
983,086.
Patented Jan. 31, 1911.
9 SHEETS—SHEET 4.
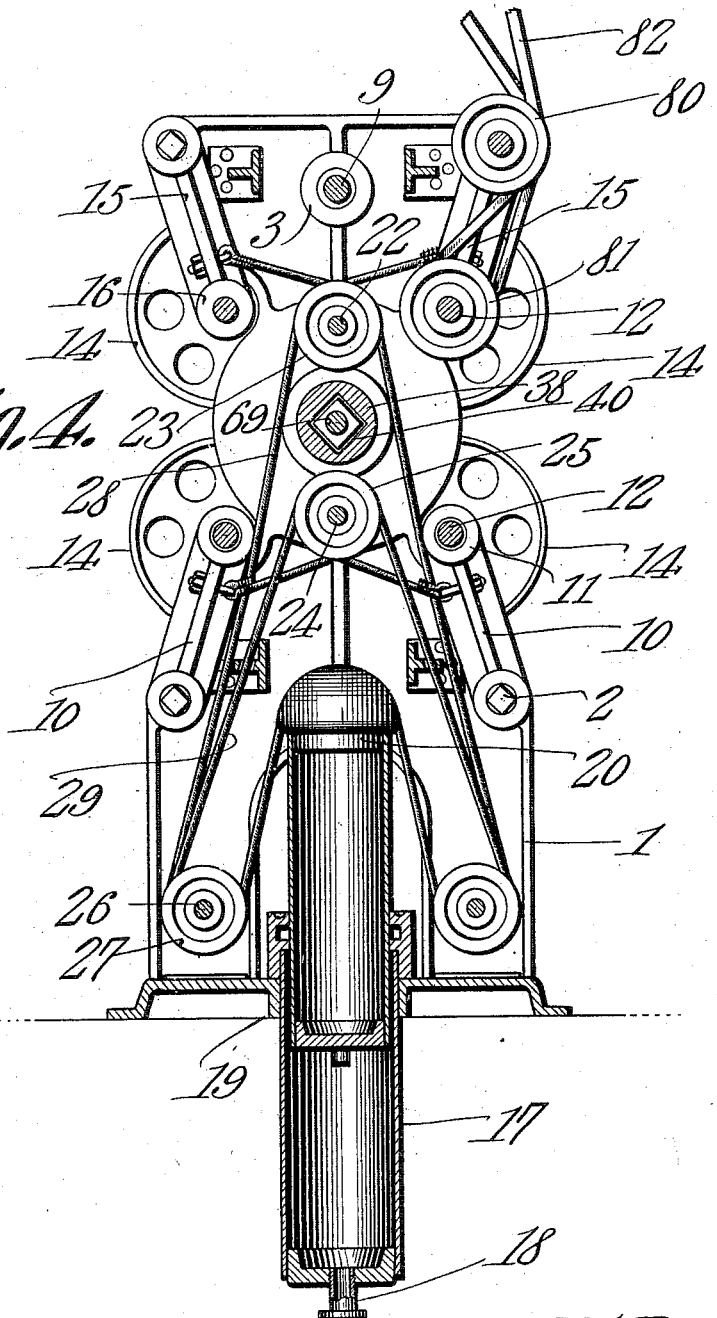
Fig. 4.
Witnesses
E. G. Stewart
E. E. Preinkert
Inventor
Edgar U. G. Reagan.
By C. A. Snow & Co.
Attorneys

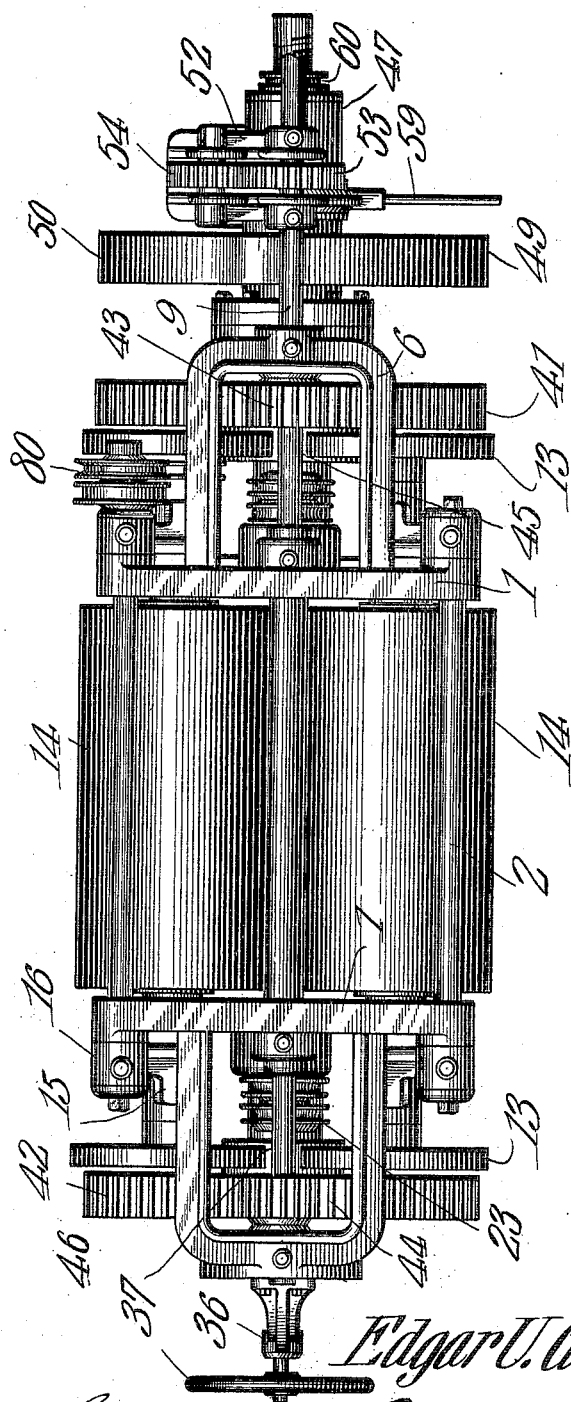

E. U. G. REAGAN.
ROLLER PRESS.
APPLICATION FILED OCT. 9, 1909.
983,086.
Patented Jan. 31, 1911.
9 SHEETS—SHEET 6.
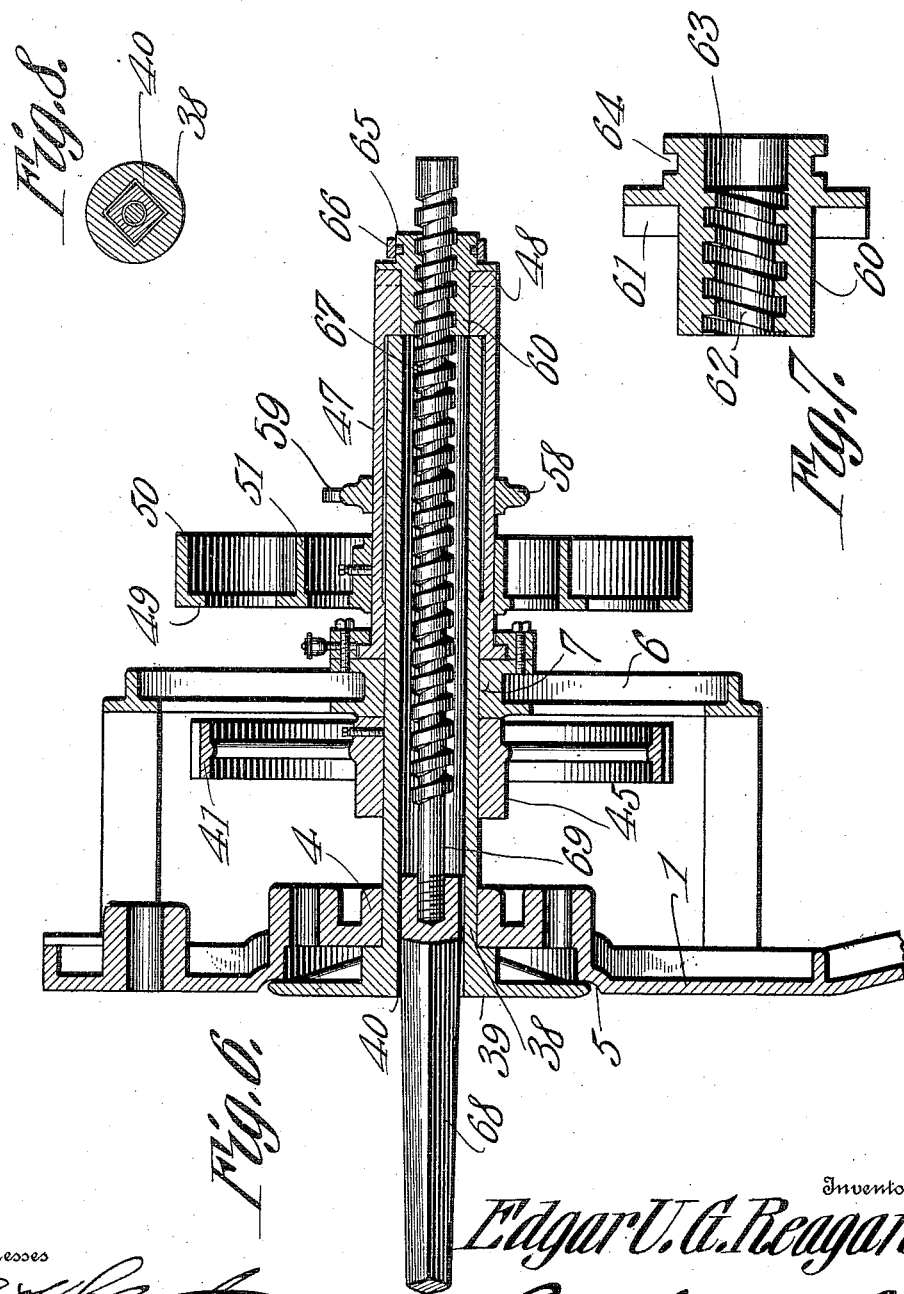
Witnesses
Inventor
Edgar U. G. Reagan.
By C. A. Snow & Co.
Attorneys E. U. G. REAGAN.
ROLLER PRESS.
APPLICATION FILED OCT. 9, 1909.
983,086.
Patented Jan. 31, 1911.
9 SHEETS—SHEET 7.
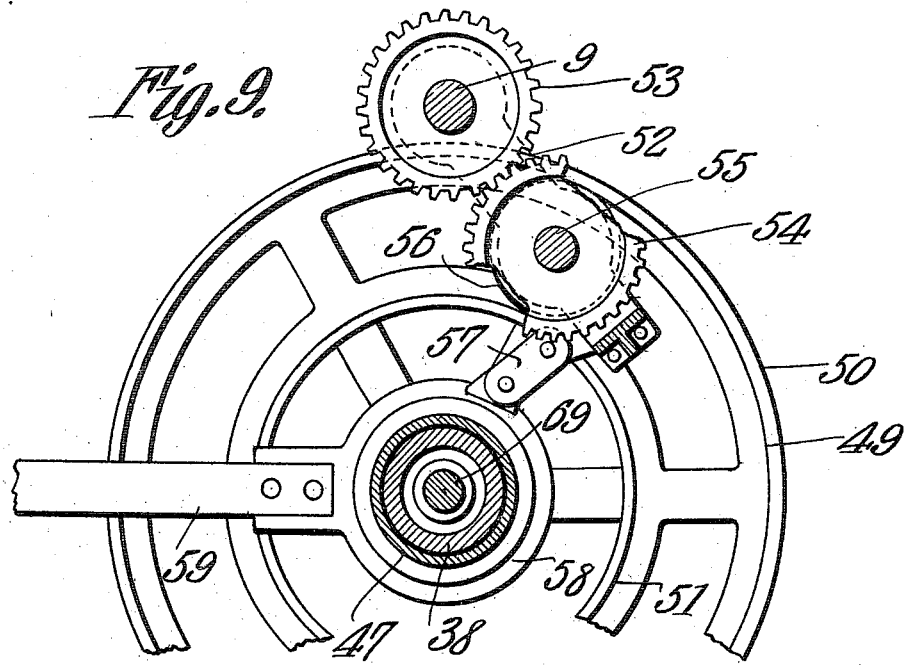
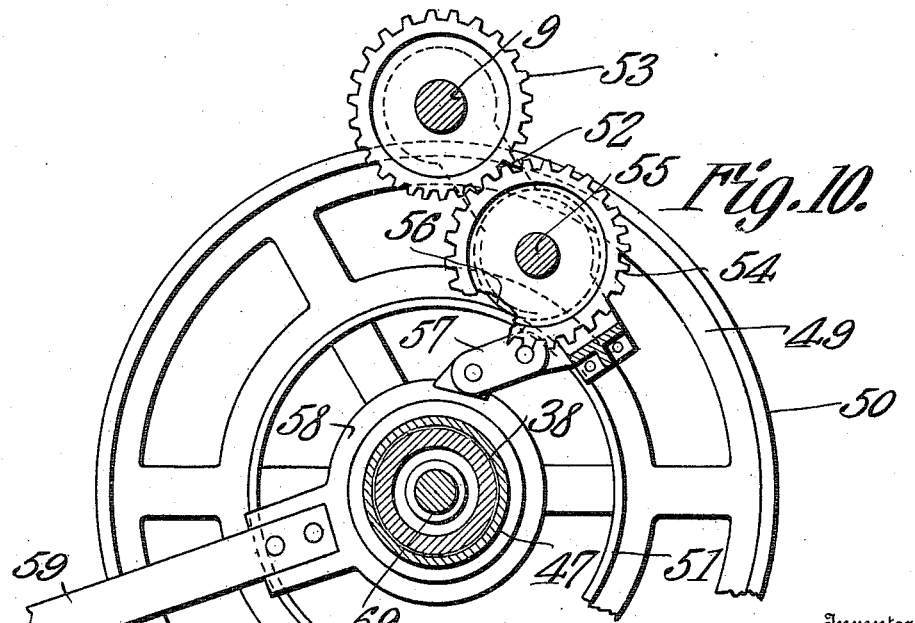
Inventor
Edgar U. G. Reagan.

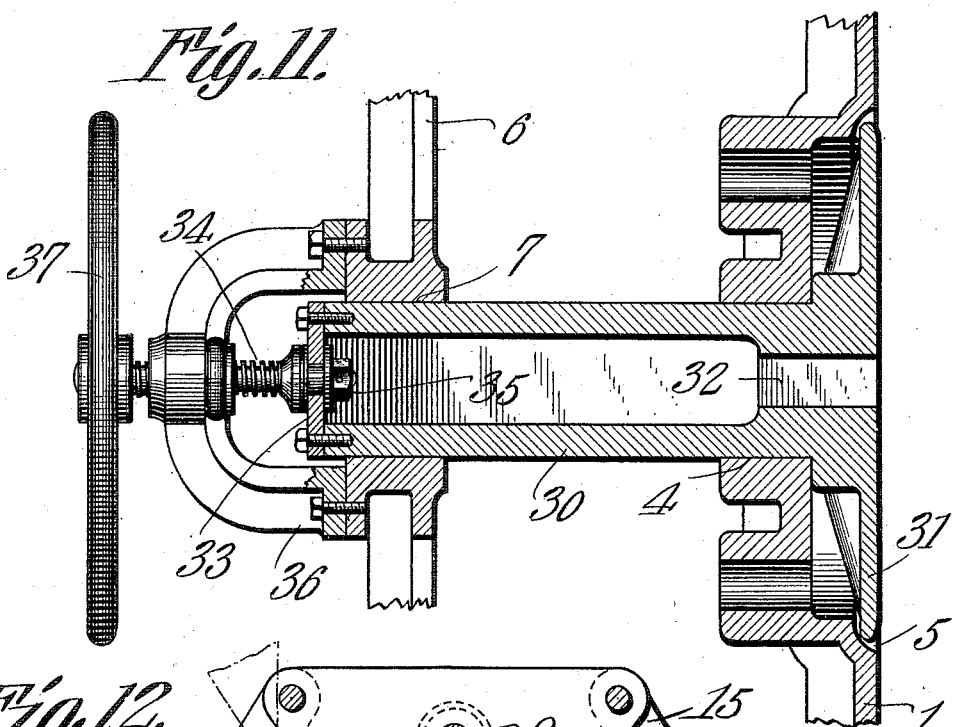
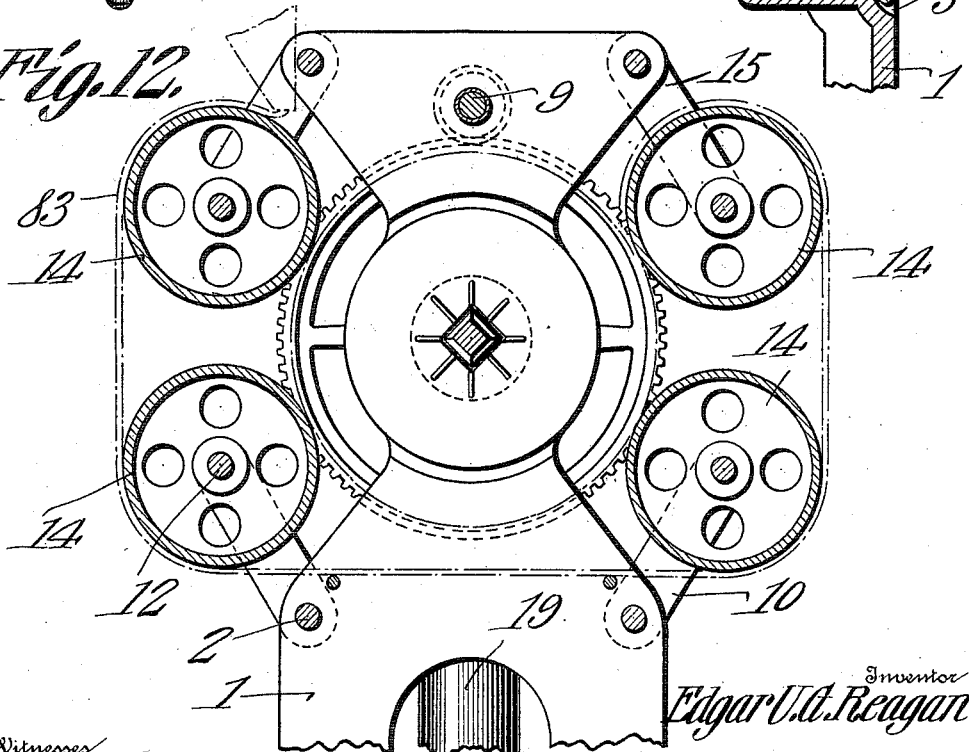

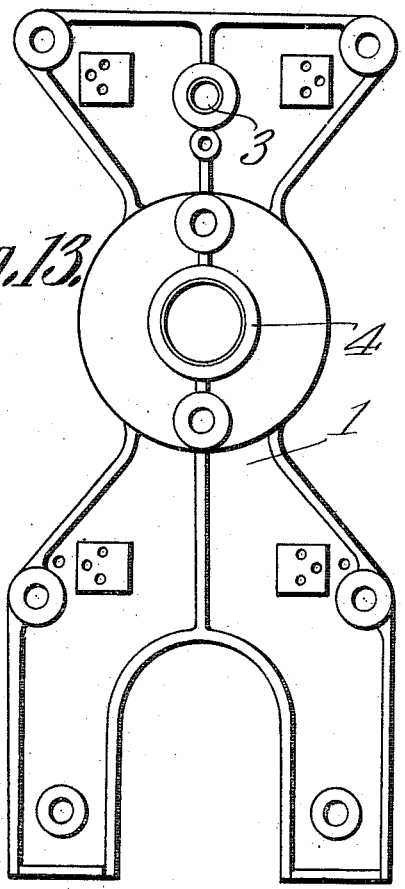
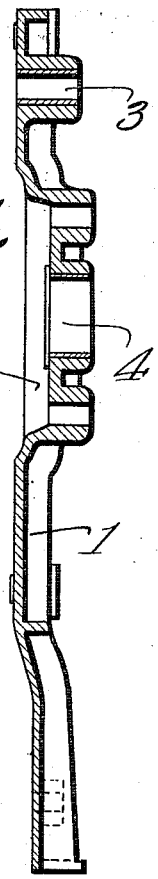
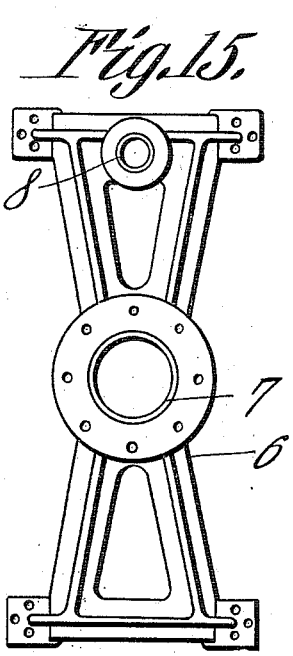
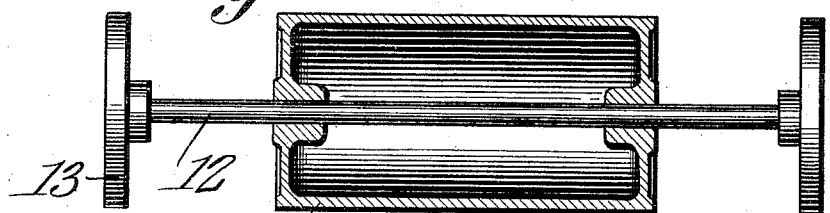

UNITED STATES PATENT OFFICE.

EDGAR U. G. REAGAN, OF SAN ANTONIO, TEXAS.

ROLLER-PRESS.

983,086.

Specification of Letters Patent.

Patented Jan. 31, 1911.

Application filed October 9, 1909. Serial No. 521,829.

*To all whom it may concern:*

Be it known that I, EDGAR U. G. REAGAN, a citizen of the United States, residing at San Antonio, in the county of Bexar and State of Texas, have invented a new and useful Roller-Press, of which the following is a specification.

This invention has relation to roller presses especially adapted to be used for forming round lap cotton bales and it consists in the novel construction and arrangement of its parts as hereinafter shown and described.

Heretofore it has been the practice in forming round lap bales to provide actuative rollers adapted to bear against the sides of the bale at different points during the process of pressing the same and inasmuch as the bale, especially when it assumes large proportions, has a tendency to remain at a state of rest and is revolved only by frictional contact of the roll, the rolls have a tendency to unwind the bat from the nucleus of the bale and consequently tremendous pressure is necessary to be applied to the rolls to effect a tightly packed bale or if this is not done the resultant bale is of a loose and flimsy nature.

It is the object of the present invention to provide a simple and an effective press for overcoming this objection and producing a tightly packed bale throughout in which the laps of the batting are firmly compressed against each other. To accomplish this the compress is provided with a mandrel upon which the initial convolution of the bat is wound and when several convolutions have been wound thereon forming a nucleus for the bale the said nucleus by reason of its increase in diameter comes in contact with the compression rolls and rotates the same. The rolls are held toward the bale during the formation of the same under pressure and the thrust of the roll is directed toward the center of the bale, and there is no tendency on the part of the rolls to unwind the convolutions of the bat from the nucleus of the bale.

After the bale is completed means is provided for withdrawing the mandrel and the bale may be further compressed to take up the space left after the mandrel is withdrawn and when the bale has been thoroughly compressed throughout its convolutions a bagging may be applied and the entire body of the bale with the bagging may then be secured by ties or equivalent means.

The advantage gained by the present invention is that the bale throughout is compressed to a uniform and a maximum degree and consequently the bale occupies minimum space in shipping.

In addition to the novel method of forming the bale as hereinbefore indicated a compress of simple design is provided for executing the method of forming the bale. This compress employs a minimum number of parts and consequently economizes in pattern work and material and effects a saving in power necessary to operate the same.

Figure 2:
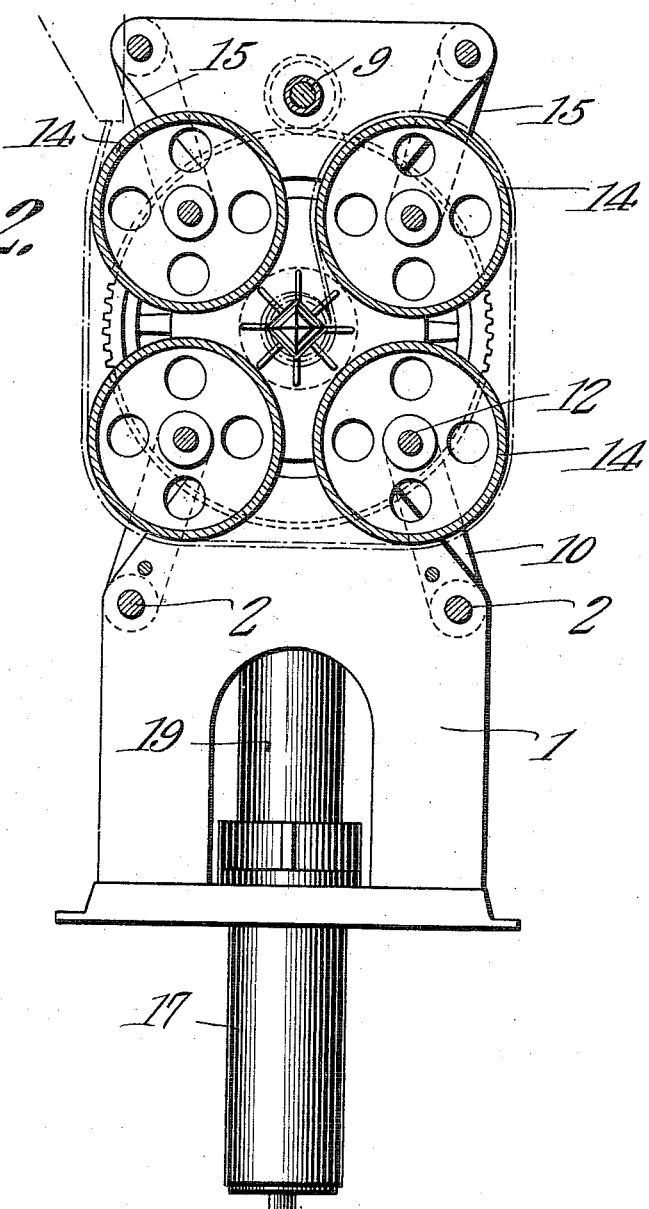
Figure 3:
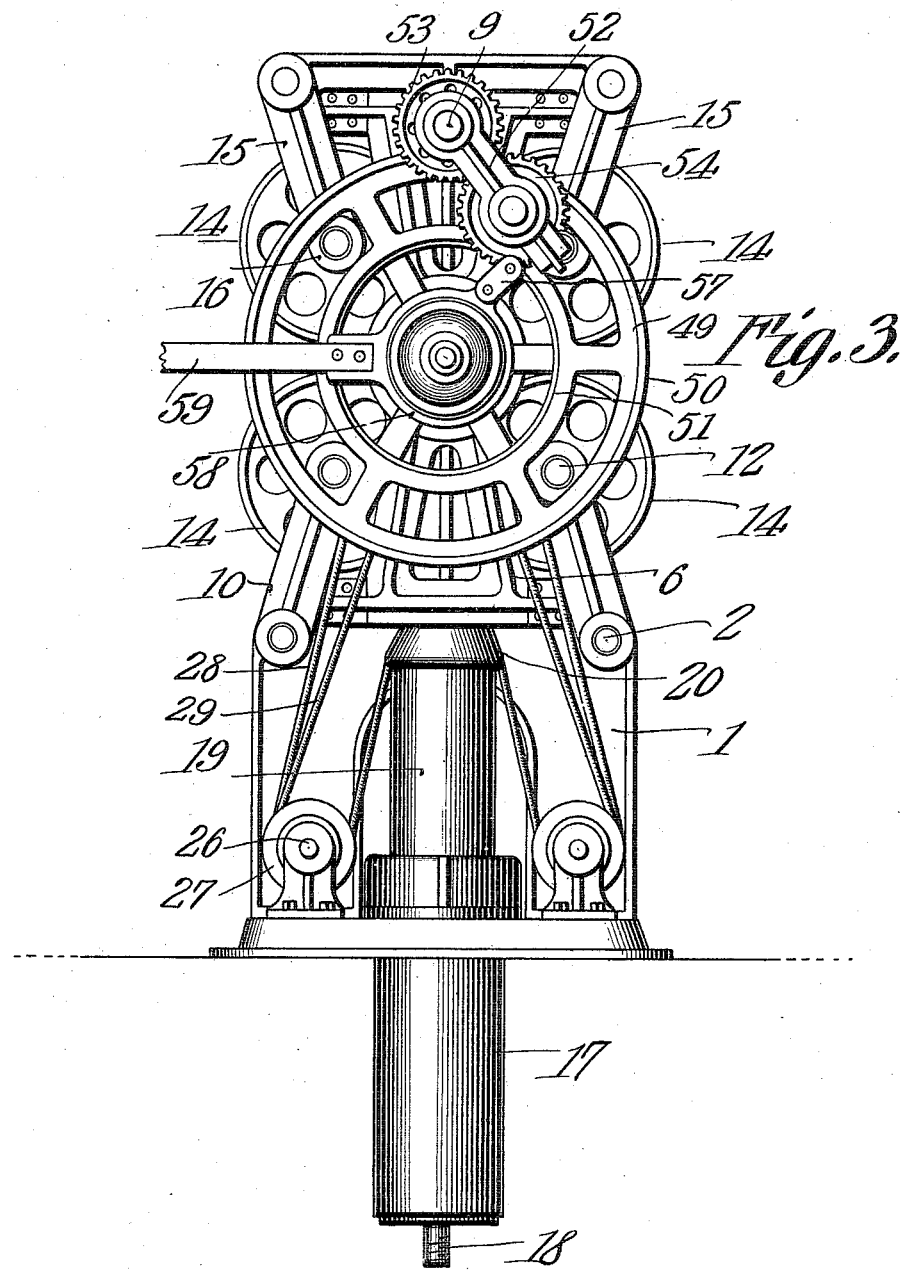

In the accompanying drawings:—Figure 1 is a side elevation of the roller press. Fig. 2 is a transverse sectional view of the rollers of the press. Fig. 3 is an elevation of the end opposite to that shown in Fig. 2. Fig. 4 is a transverse sectional view through an end portion of the roller press cut on the line 4—4 of Fig. 1. Fig. 5 is a top plan view of the roller press. Fig. 6 is a detailed sectional view of the means for withdrawing the mandrel of the roller press. Fig. 7 is an enlarged sectional view of said means. Fig. 8 is a transverse sectional view of a sleeve used in said means. Fig. 9 is a side elevation of a reversing mechanism used upon the spindle withdrawing means showing the parts in one position. Fig. 10 is a similar view of said mechanism showing the parts in another position. Fig. 11 is a detailed sectional view of means for moving one of the heads of the press. Fig. 12 is an end elevation of a part of the press illustrating the positions of the rolls when the bale approaches or arrives at maturity. Fig. 13 is a side elevation of a standard forming a portion of the framework of the press. Fig. 14 is a vertical sectional view of the same. Fig. 15 is a side elevation of secondary standards used in the frame of the press. Fig. 16 is a longitudinal sectional view of one of the rolls showing attached parts in elevation.

Standards 1 form component parts of the frame of the press and the said standards are spaced from each other and held at proper distances apart by means of cross bars 2, the ends of which project beyond the outer sides of the said standards 1. The standards 1 are provided at their upper portions with bearings 3 and at intermediate points with bearings 4. The inner faces of the standards 1 about the bearings 4 are provided with annular depressions 5. Supplemental standards 6 in the form of approximately X shaped brackets are applied to the upper outer side portions of the standards 1 and the said supplemental standards 6 are provided with bearings 7 alined with the bearings 4 and with bearings 8 alined with the bearings 3 of the standards 1. A power shaft 9 is journaled in the bearings 8 of the supplemental standards 6 and bearings 3 of the primary standards 1. Any suitable means may be provided for rotating the said shaft 9.

Arms 10 are pivotally mounted upon the projecting ends of the lower bars 2 and are provided at their free ends with bearings 11. Shafts 12 are journaled in the bearings 11 and are provided at their ends with fixed disks 13. Cylinders 14 are fixed to the intermediate portions of the shafts 12. Arms 15 are pivotally mounted upon the projecting ends of the upper bars 2 and are provided at their lower free ends with bearings 16. Said bearings 16 receive shafts 12 as above described and said shafts carry disks 13 and rolls 14. Cylinders 17 are located under the standards 1 and air pipes 18 are connected with the lower ends of the said cylinders. Pistons 19 are mounted for reciprocation in the cylinders 17 and are provided at their upper ends with hemispherical heads 20. The said heads 20 are provided with grooves 21. Spindles 22 are fixed to the standards 1 above the bearings 4 and sheaves 23 are journaled upon the said spindles. Spindles 24 are fixed to the standards 1 below the bearings 4 and sheaves 25 are journaled upon the spindles 24. Spindles 26 are located near the bases of the standards 1 and sheaves 27 are journaled for rotation upon the spindles 26. A cable 28 is attached at one end to one of the arms 15 then the said cable passes over the upper portion of one of the sheaves 23 and then down under one of the sheaves 27 at one side of the cylinder 17 then up and through one of the grooves in the hemispherical head 20 of the piston 19 then down under one of the sheaves 27 at the other side of the cylinder 17 then up over the other sheave 22 and is attached at its other end to the other arm 15. In a like manner a cable 29 is attached at one end to one of the arms 10 and then passes over one of the sheaves 25 and down and around one of the sheaves 27. The said cable then passes over the upper portion of the hemispherical head 20 through one of the grooves 21 provided therein then down under a sheave 27 at the other side of the cylinder 17 then up over the other sheave 25 upon the spindle 24 and is connected at its other end with the other arm 10. By this arrangement it will be seen that when air is admitted into the cylinder 17 through the pipe 18 and the piston 19 is elevated the lower portions or runs of the cables 28 and 29 will be pushed up between the sheave 27 at the opposite side of the compress and thus the ends of the said cable will be drawn toward each other which will have the effect of bringing all of the cylinders 14 toward a common center. The said cylinders will be held in such position under the pressure of the air contained within the cylinder 17.

A sleeve 30 is journaled for rotation in the bearings 4 of one of the standards 1 and is provided at its inner end with a head 31 which at times is adapted to enter the recess 5 provided in the inner face of the said standard 1. The head 31 is provided at its center with an opening 32 which is square in transverse section and is adapted to receive the end of a spindle hereinafter to be described. The outer portion of the sleeve 30 is journaled in the bearing 7 of one of the secondary standards 6 and the said sleeve is provided at its outer end with a plate 33 to which is journaled the inner end of a screw 34. The said screw 34 is restrained against relative longitudinal movement with relation to the sleeve 30 by means of a nut 35 which is screwed against the inner face of the plate 33. A yoke 36 is attached to the outer side of the supplemental standard 6 and the screw 34 engages a thread provided in the intermediate portion of the said yoke. A hand wheel 37 is fixed to the outer end of the screw 34 and may be rotated manually.

It will be seen that by turning the wheel 37 that the screw 34 will be moved longitudinally with relation to the yoke 36 and that the sleeve 30 is moved longitudinally in the bearing 7 of the standard 6 and bearing 4 of the standard 1. Thus the disk 31 carried by the said sleeve 30 may be projected in a plane beyond the recess 5 in the standard 1 or may be withdrawn into the said recess. The object of this will be explained hereinafter.

A sleeve 38 is journaled for rotation in the bearings 4 of the standard 1 at the other side of the compress and is also journaled at its outer portion in the bearing 7 of the supplemental standard 6. A disk 39 is fixed to the inner end of the sleeve 38 and is provided with an opening 40 at its center which is square in transverse section. The said opening 40 extends back throughout the length of the sleeve 38 and is of the same transverse configuration throughout. A gear wheel 41 is fixed to the sleeve 38 and is located between the standards 1 and fixed as shown in Fig. 6 of the drawings. A gear wheel 42 of the same diameter as the gear wheel 41 is fixed to the sleeve 30 and is located between the standards 1 and 6 at the other side of the compress. Pinions 43 and 44 are fixed to the shaft 9 and mesh with the gear wheels 41 and 42 respectively. Disks 45 and 46 are fixed to the sleeves 38 and 30 respectively and are engaged by the disks 13 of the shafts of the cylinders 14 prior to the formation of the bale between the said cylinders.

A sleeve 47 is journaled upon the outer portion of the sleeve 38 and is provided at its outer end with clutch notches or recesses 48. A disk 49 is fixed to the sleeve 47 and is provided with an outer annular rim 50 and an inner annular rim 51. A bracket 52 has bearings which receive the shaft 9 and the said bracket normally hangs pendant from the said shaft. A gear wheel 53 is fixed to the shaft 9 between the ends of the bracket 52 and meshes with a gear wheel 54 which is fixed to a spindle 55 journaled in the bracket 52. Upon the inner end of the said spindle 55 is fixed a friction disk 56 which is located between the flanges 50 and 51 of the disk 49. A link 57 is pivotally connected to the lower portion of the bracket 52 and the lower end of the said link is pivotally connected with a ring 58 which encircles the sleeve 47 and is provided with an operating handle 59. By this arrangement it will be observed that by swinging the handle 59 and turning the ring 58 about the sleeve 47 that the bracket 52 may be swung upon the axis of the shaft 9 so as to cause the friction disk 56 to engage with either the ring 50 upon the disk 49 or the ring 51.

A clutch member 60 is slidably located in the outer end of the sleeve 47 and is provided with lugs 61 adapted to enter the recesses 48 located at the outer end of the said sleeve 47. The clutch member 60 is provided with an internal thread 62 at its inner end portion and a smooth bore 63 at its outer portion. An annular ring 64 is provided at the outer portion of the said clutch member 60 and receives pins 65 carried by a ring 66 which may be moved laterally with relation to the long dimension of the sleeve 47 by means of a lever or an equivalent device.

A screw shaft 67 has threaded engagement with the thread 62 of the clutch member 60 and to the inner end of the said shaft 67 is fixed a mandrel 68. Between the outer end of the mandrel 68 and the adjacent end of the thread of the shaft 67 a smooth or cylindrical portion 69 is provided upon the said shaft.

The mandrel 68 tapers slightly from that end which is connected with the shaft 67 toward its other end which is disconnected from other parts and is approximately rectangular in transverse section. The outer or larger end of the mandrel 68 is guided in the noncircular opening 40 provided in the sleeve 38 and consequently the mandrel 68 cannot rotate independently of the sleeve 38 or the disk 39 attached thereto. The said mandrel 68 however may move longitudinally within the sleeve 38.

By way of explanation, it may be stated that during the formation of the bale, the mandrel 68 is projected to the farthest extent beyond the inner face of the disk 39, and when the bale has been completed and it is desired to remove the same from the compress, it is necessary first to withdraw the mandrel 68 from the center of the bale and thus it will be seen that the mechanism just above described may be operated to cause the withdrawal of the mandrel 68. The longitudinal movement of the said mandrel is effected as follows:—presuming that the mandrel 68 is projected to the farthest extent beyond the inner face of the disk 79 and it is desired to withdraw the said mandrel within the opening in the sleeve 38 and the said sleeve is in a state of rotation, the lever 59 above described is swung so that the disk 56 is brought in contact with the inner surface of the outer ring 50 upon the disk 49. Thus the said disk 49 is caused to rotate approximately at the same rate of speed as that at which the sleeve 38 is rotating, but in an opposite direction. The lever connected with the ring 66 is then moved slightly outward so that the thread of the clutch member 60 is engaged with the thread of the shaft 67. As the sleeve 47 is turning in an opposite direction to that in which the sleeve 38 is turning and the mandrel 68 is restrained independently of the said sleeve 38, the engagement of the threads of the shaft 67 and the clutch member 60 will cause the said shaft 67 to move longitudinally in an outward direction and thus the mandrel 68 is withdrawn in the sleeve 38 from the projected position beyond the inner face of the disk 69. When the enlarged end of the mandrel 68 comes in contact with the inner end of the clutch member 60, the shaft 67 is moved to such an extent that the smooth portion 69 is within the threaded portion 62 of the said clutch member 60 and consequently when the enlarged end of the mandrel 68 strikes the inner end of the member 60, the said member is forced in an outward direction so that its lugs 61 disengage from the recesses 48 provided in the outer end of the sleeve 47 and thus while the shaft 67 continues to rotate in unison with the sleeve 38, it ceases to move longitudinally for the reason that the clutch member 61 ceases to move with the sleeve 47 and remains either at rest or rotates with the sleeve 38. Thus it will be seen that means is provided for withdrawing the spindle 60 from the bale. When it is desired to project the mandrel 68 beyond the inner face of the disk 39 an operator swings the lever 59 so that the friction disk 56 is caused to engage the outer surface of the inner ring 51 upon the disk 49. Thus the sleeve 47 is caused to rotate in the same direction as that in which the sleeve 38 is rotated but at a faster rate of speed. The operator then moves the ring 66 so that the lugs 61 of the clutch member 60 engage the recesses 48 at the outer end of the sleeve 47 and inasmuch as the said sleeve 47 is rotating at a greater rate of speed than the sleeve 38 and as the mandrel 68 is restrained against rotary movement with relation to the said sleeve 38, the shaft 37 must move longitudinally within the sleeve 38 and consequently the mandrel 68 is projected beyond the inner face of the disk 39. When the mandrel is projected to a sufficient degree the operator manually disengages the clutch member 60 from the sleeve 47 as above described.

By references to Figs. 1 and 4 of the drawings, it will be seen that one of the upper cross bars 2 is provided in its outer extremity with journaled sheaves 80 and that upon one of the shafts 12 is located a sheave 81. A belt 82 passes around the sheave 81 and against the outer side of the sheave 80. The belt 82 is adapted to operate a condenser, not shown, but when the shaft 12 upon which the sheave 81 is located is swung toward the median line of the standard 1, the belt 82 is maintained in a taut condition but when the said shaft 12 swings out as the bale arrives at maturity, the belt 82 becomes slack and consequently the operation of the feeders in the condenser is checked.

Fig. 12 of the drawings illustrates the manner in which the batting 83 passes around the cylinders 14 and is eventually wound around the bale formed upon the mandrel 68. The said batting 83 comes from the condenser (not shown) and passes over the upper portion of one of the upper rolls 14 then down under the lower roll 14 at the same side of the compress, then transversely across the compress and under the lower roll 14 at the other side thereof, then up over the upper roll at the other side of the compress, then down and around the bale formed upon the said mandrel 68. When the bale is started, the said batting is wound directly upon the mandrel 68 and during the course of formation of the nucleus of the bale, the disks 30 roll against the peripheries of the disks 36 and 45. When the formation of the bale progresses to such an extent that the convolutions of the batting come in contact with the peripheries of the rolls 14 the said rolls 14 are pushed laterally apart and continue to rotate in consequence of the frictional contact between their peripheries and the outer wrap of the bale. The said rolls 14 are held toward the center of the bale by reason of the fact that each cylinder 17 contains a volume of compressed air which forces the pistons 19 up and maintains the cables 28 and 29 in a taut condition. As the bale continues to increase in diameter and the rolls 14 are farther spread apart the cables 28 and 29 are moved lengthwise so that the lower run thereof works down upon the piston 19 and further compresses the air contained within the cylinder 17 or forces the same against the compressing engine. Thus it will be seen that in the initial stage in the formation of the bale, the rolls 14 are rotated through the instrumentality of the disks 13 bearing against the peripheries of the disks 45 and 46 and thus the batting which passes around the said rolls is fed to the nucleus of the bale. When the bale assumes the diameter sufficient to cause its sides to come in contact with the peripheries of the rolls 14 the disks 13 are forced away from the disks 45 and 46 and the rolls 14 are rotated through frictional contact with the sides of the bale. Thus the said rolls 14 continue to feed the batting to the bale and by reason of the fact that the said rolls are held under pressure against the sides of the bale the batting is compressed at each convolution of the bale.

When the bale has arrived at the point of completion, the rolls 14 have been spread apart to such an extent that the sheave 81 is moved so that the belt 82 becomes loose and consequently the condenser and feeder operated by the said belt 82 ceases to supply the batting and that which has been supplied to the condenser is rolled into a round bale. The mandrel 68 is then withdrawn from the center of the bale as above described and the operation of the press is stopped. Bagging is then applied to the exterior of the bale and the press is again started and said bagging is firmly pressed about the periphery of the bale under the roll 14 and the bale is further compressed so that the interior convolutions of the batting are forced into the space from which the spindle is withdrawn. The press is then stopped and the bale with the bagging thereon may be tied. An operator then turns the hand wheel and the sleeve 30 is then moved longitudinally in the bearing 4 of the standard 1 and bearing 7 of the standard 6 and the disk 31 is moved away from the end of the bale. Thus the bale is rendered free and may be readily removed from the press in a finished condition.

Having described my invention, what I claim as new and desire to secure by Letters Patent is:—

1. A press comprising a frame, disks journaled for rotation in the frame, arms pivoted to the frame, rolls freely journaled to the arms, a mandrel fixed to one of the disks and slidably mounted with relation to the same and means for moving the said mandrel longitudinally with relation to the disk upon which it is mounted.

2. A press comprising a frame, arms pivoted thereto, rolls freely journaled upon said arms, a mandrel journaled for rotation upon the frame, means for holding the rolls under pressure toward the mandrel, means for withdrawing the mandrel from between the rolls, means carried by the shaft of one of the rolls for operating a feeder when the roll is toward the mandrel and for permitting the feeder to come to a state of rest when the roll is moved away from the mandrel.

3. A press comprising a frame, journaled rolls carried by the frame, a disk journaled for rotation in the frame, a sleeve carried by the disk and having a non-circular opening, a mandrel slidably mounted in the opening of the sleeve but restrained against independent rotation with relation thereto, a second sleeve journaled upon the first said sleeve, a friction member adapted to engage the second said sleeve and having a threaded opening, a threaded mandrel shaft engaging the thread of said member and attached to the mandrel and means for rotating the second said sleeve independently of the first said sleeve.

4. In a press frame, a disk journaled for rotation therein and having a journaled sleeve attached thereto, a second sleeve journaled upon the first said sleeve and having a clutch end, a clutch member adapted to engage the clutch end of the second said sleeve and having a threaded opening, a threaded mandrel shaft engaging the thread of the clutch member, a mandrel carried by the mandrel shaft and means for rotating the second said sleeve independently of the first said sleeve.

In testimony that I claim the foregoing as my own, I have hereto affixed my signature in the presence of two witnesses.

EDGAR U. G. REAGAN.

Witnesses:
E. HUME TALBERT,
E. C. SCHLADT.